US012535579B2

United States Patent
Sugae et al.

(10) Patent No.: US 12,535,579 B2
(45) Date of Patent: Jan. 27, 2026

(54) OBJECT DETECTION DEVICE AND OBJECT DETECTION SYSTEM

(71) Applicant: AISIN CORPORATION, Kariya (JP)

(72) Inventors: Ippei Sugae, Kariya (JP); Hisashi Inaba, Kariya (JP)

(73) Assignee: AISIN CORPORATION, Kariya (JP)

( * ) Notice: Subject to any disclaimer, the term of this patent is extended or adjusted under 35 U.S.C. 154(b) by 746 days.

(21) Appl. No.: 17/208,337

(22) Filed: Mar. 22, 2021

(65) Prior Publication Data

US 2021/0318432 A1 Oct. 14, 2021

(30) Foreign Application Priority Data

Apr. 8, 2020 (JP) .................. 2020-069983

(51) Int. Cl.
*G01S 15/931* (2020.01)
*G01S 15/08* (2006.01)

(52) U.S. Cl.
CPC ............ *G01S 15/931* (2013.01); *G01S 15/08* (2013.01); *G01S 2015/938* (2013.01)

(58) Field of Classification Search
None
See application file for complete search history.

(56) References Cited

U.S. PATENT DOCUMENTS

| 5,343,284 | A | * | 8/1994 | Keeler | ............... | H04N 7/18 |
| | | | | | | 348/81 |
| 7,496,157 | B2 | | 2/2009 | Katou et al. | | |
| 10,958,323 | B1 | * | 3/2021 | Ben-Yishay | ......... | H04B 7/0608 |

| 2006/0196272 | A1 | * | 9/2006 | Sugiura | ............. | G01S 7/521 |
| | | | | | | 73/599 |

(Continued)

FOREIGN PATENT DOCUMENTS

| JP | 2005-249770 A | 9/2005 |
| WO | 2016/103464 A1 | 6/2016 |

OTHER PUBLICATIONS

Pailhas, Spatially Distributed MIMO Sonar Systems: Principles and Capabilities, IEEE Journal of Oceanic Engineering, (Year: 2016).*

*Primary Examiner* — Isam A Alsomiri
*Assistant Examiner* — Vikas Atmakuri
(74) *Attorney, Agent, or Firm* — Sughrue Mion, PLLC (57) ABSTRACT

An object detection device includes: a transmission unit transmitting a transmission wave substantially at the same time with another transmission unit in another object detection device; a reception unit receiving a reception wave including surges corresponding to a result of return of the transmission wave by the transmission unit and another transmission wave by the another transmission unit in accordance with reflection by an object; an identification unit identifying a transmission source of the surges included in the reception wave; and a detection unit detecting information related to the object based on a correspondence relationship between a first peak of a first waveform indicating a first surge transmitted by the another transmission unit and received by the reception unit and a second peak of a second waveform indicating a second surge transmitted by the transmission unit and received by another reception unit provided in the another object detection device.

7 Claims, 7 Drawing Sheets

(56) References Cited

U.S. PATENT DOCUMENTS

| | | | |
|---|---|---|---|
| 2012/0120768 A1* | 5/2012 | Horsky | G01S 15/931 |
| | | | 327/60 |
| 2013/0166113 A1* | 6/2013 | Dakin | G01P 13/025 |
| | | | 356/28 |
| 2016/0274235 A1* | 9/2016 | Martin | G01S 7/539 |
| 2017/0185954 A1* | 6/2017 | McAllister | H01Q 1/2216 |
| 2018/0106898 A1* | 4/2018 | Baskaran | G01S 13/723 |
| 2019/0339386 A1 | 11/2019 | Ding et al. | |
| 2020/0081120 A1* | 3/2020 | Soldner | G01S 15/10 |
| 2020/0142068 A1* | 5/2020 | Crouch | G01S 7/4818 |
| 2020/0225332 A1* | 7/2020 | Wagner | G01S 7/4863 |
| 2020/0333533 A1* | 10/2020 | Rogers | G01S 7/4812 |
| 2020/0341108 A1* | 10/2020 | Heller | G01S 7/034 |
| 2021/0341604 A1* | 11/2021 | Greenberg | H04B 10/524 |

\* cited by examiner

OBJECT DETECTION DEVICE AND OBJECT DETECTION SYSTEM

CROSS REFERENCE TO RELATED APPLICATIONS

This application is based on and claims priority under 35 U.S.C. § 119 to Japanese Patent Application 2020-069983, filed on Apr. 8, 2020, the entire content of which is incorporated herein by reference.

TECHNICAL FIELD

This disclosure relates to an object detection device and an object detection system.

BACKGROUND DISCUSSION

In related art, there is known a technique in which a correlation value between a transmission wave and a reception wave that is the transmission wave reflected and returned by an object is acquired (calculated), whether a similarity degree between the transmission wave and the reception wave is equal to or more than a predetermined level is determined based on the correlation value, and a distance to the object is detected as one piece of information related to the object by a time of flight (TOF) method or the like based on a determination result (Reference 1 (JP 2005-249770A)).

In the technique of the related art as described above, it is desired to detect information related to the object to be detected with higher accuracy while avoiding an influence of clutter generated due to reflection by an object not to be detected.

A need thus exists for an object detection device and an object detection system which are not susceptible to the drawback mentioned above.

SUMMARY

An object detection device as an example of this disclosure includes: a transmission unit configured to transmit a transmission wave substantially at the same time with another transmission unit provided in another object detection device; a reception unit configured to receive a reception wave including a plurality of surges corresponding to a result of return of the transmission wave transmitted by the transmission unit and another transmission wave transmitted by the another transmission unit in accordance with reflection by an object; an identification unit configured to identify a transmission source of the plurality of surges included in the reception wave; and a detection unit configured to detect information related to the object based on a correspondence relationship between a first peak of a first waveform indicating a first surge transmitted by the another transmission unit provided in the another object detection device and received by the reception unit and a second peak of a second waveform indicating a second surge transmitted by the transmission unit and received by another reception unit provided in the another object detection device, the first peak and the second peak being specified based on an identification result of the identification unit and another identification unit provided in the another object detection device.

An object detection system as another example of this disclosure includes: a plurality of object detection devices each including a transmission unit configured to transmit a transmission wave substantially at the same time with another transmission unit provided in another object detection device, a reception unit configured to receive a reception wave including a plurality of surges corresponding to a result of return of the transmission wave transmitted by the transmission unit and another transmission wave transmitted by the another transmission unit in accordance with reflection by an object, and an identification unit configured to identify a transmission source of the plurality of surges included in the reception wave; and a detection unit configured to detect information related to the object based on a correspondence relationship between a first peak of a first waveform indicating a first surge transmitted by the transmission unit of a first object detection device among the plurality of object detection devices and received by a second object detection device different from the first object detection device among the plurality of object detection devices and a second peak of a second waveform indicating a second surge transmitted by the transmission unit of the second object detection device and received by the reception unit of the first object detection device, the first peak and the second peak being specified based on an identification result by the identification unit of each of the plurality of object detection devices.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings. Configurations of the embodiments described below and operations and effects provided by the configurations are merely examples and are not limited to the following description.

Embodiment

Figure 1:
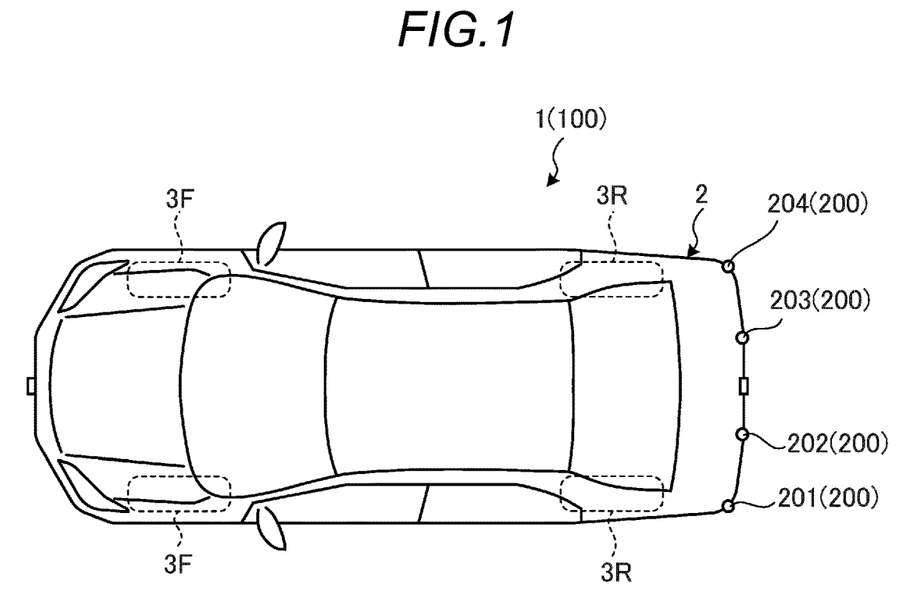
FIG. 1 is a schematic view showing an example of an appearance of a vehicle including an object detection system according to an embodiment when viewed from above.

FIG. 1 is a schematic view showing an example of an appearance of a vehicle 1 including an object detection system according to an embodiment when viewed from above.

As shown in FIG. 1, the object detection system includes an electronic control unit (ECU) 100 mounted inside the four-wheel vehicle 1 including a pair of front wheels 3F and a pair of rear wheels 3R, and object detection devices 201 to 204 mounted on an exterior of the vehicle 1.

In the example shown in FIG. 1, as an example, the object detection devices 201 to 204 are provided at different positions on, for example, a rear bumper on a rear end of a vehicle body 2 that is the exterior of the vehicle 1.

Here, in the embodiment, hardware configurations and functions of the object detection devices 201 to 204 are the same as each other. Therefore, in the following description, the object detection devices 201 to 204 may be collectively referred to as object detection devices 200 for simplification.

In the embodiment, setting positions of the object detection devices 200 are not limited to the example shown in FIG. 1. The object detection devices 200 may be provided, for example, on a front bumper on a front end of the vehicle body 2, on a side surface of the vehicle body 2, or on two or more of the rear bumper, the front bumper, and the side surface. In the embodiment, the number of the object detection devices 200 is not limited to the example shown in FIG. 1. However, a technique of the embodiment is effective in a configuration in which there are a plurality of object detection devices 200.

The object detection system according to the embodiment performs transmission and reception of ultrasonic waves based on a configuration to be described later and acquires a time difference or the like between the transmission and the reception, thereby detecting information related to an object (for example, an object O shown in FIG. 2 to be described later) including a person present around the object detection system.

Figure 2:
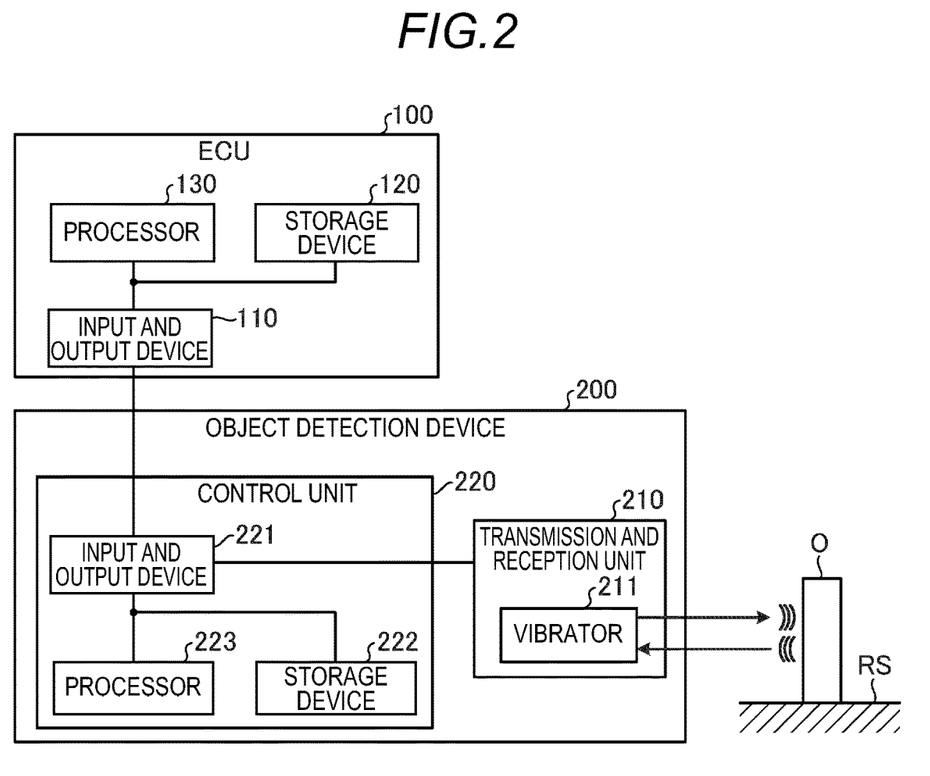
FIG. 2 is a schematic block diagram showing an example of schematic hardware configurations of an electronic control unit (ECU) and an object detection device of the object detection system according to the embodiment.

FIG. 2 is a schematic block diagram showing an example of hardware configurations of the ECU 100 and the object detection device 200 of the object detection system according to the embodiment.

As shown in FIG. 2, the ECU 100 has a hardware configuration the same as that of a normal computer. More specifically, the ECU 100 includes an input and output device 110, a storage device 120, and a processor 130.

The input and output device 110 is an interface for implementing transmission and reception of information between the ECU 100 and the outside (the object detection device 200 in the example shown in FIG. 1).

The storage device 120 includes a main storage device such as a read only memory (ROM) or a random access memory (RAM), and/or an auxiliary storage device such as a hard disk drive (HDD) or a solid state drive (SSD).

The processor 130 manages various processing executed by the ECU 100. The processor 130 includes an arithmetic device, for example, a central processing unit (CPU). The processor 130 reads and executes a computer program stored in the storage device 120, thereby implementing various functions, for example, parking assistance.

On the other hand, as shown in FIG. 2, the object detection device 200 includes a transmission and reception unit 210 and a control unit 220. With these configurations, the object detection device 200 is an in-vehicle sonar as an example of an in-vehicle sensor that detects a distance to an object present outside.

The transmission and reception unit 210 includes a vibrator 211 such as a piezoelectric element, and the transmission and reception of the ultrasonic waves are implemented by the vibrator 211.

More specifically, the transmission and reception unit 210 transmits, an ultrasonic wave generated in accordance with vibration of the vibrator 211 as a transmission wave, and receives, the vibration of the vibrator 211 caused by the ultrasonic wave transmitted as the transmission wave being reflected by an object present outside and returned as a reception wave. In the example shown in FIG. 2, a road surface RS and the object O provided on the road surface RS are shown as objects that can reflect the ultrasonic wave from the transmission and reception unit 210.

The example shown in FIG. 2 shows a configuration in which both the transmission of the transmission wave and the reception of the reception wave are implemented by the single transmission and reception unit 210 including the single vibrator 211. However, the technique of the embodiment is also naturally applicable to a configuration in which a configuration on a transmission side and a configuration on a reception side are separated, for example, a configuration in which a first vibrator for transmitting the transmission wave and a second vibrator for receiving the reception wave are separately provided.

The control unit 220 has a hardware configuration the same as that of a normal computer. More specifically, the control unit 220 includes an input and output device 221, a storage device 222, and a processor 223.

The input and output device 221 is an interface for implementing transmission and reception of information between the control unit 220 and the outside (the ECU 100 and the transmission and reception unit 210 in the example shown in FIG. 1).

The storage device 222 includes a main storage device such as a ROM or a RAM, and/or an auxiliary storage device such as an HDD or an SSD.

The processor 223 manages various processing executed by the control unit 220. The processor 223 includes an arithmetic device, for example, a CPU. The processor 223 reads and executes a computer program stored in the storage device 333, thereby implementing various functions.

Here, the object detection device 200 according to the embodiment detects a distance to an object as information related to the object by a technique referred to as a so-called time of flight (TOF) method. As described in detail below, the TOF method is a technique of calculating a distance to an object in consideration of a difference between a timing at which the transmission wave is transmitted (more specifically, the transmission is started) and a timing at which the reception wave is received (more specifically, the reception is started).

Figure 3:
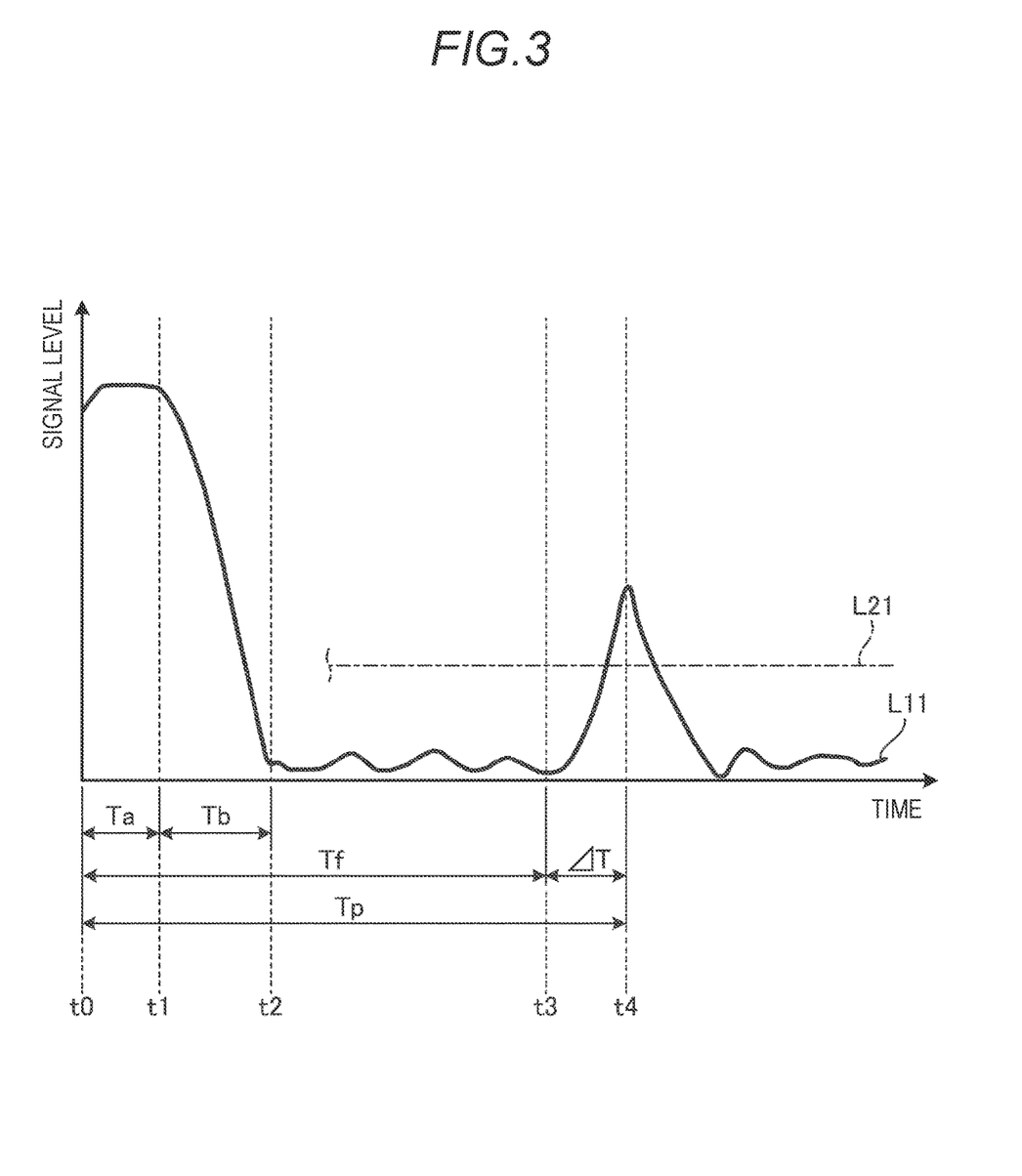
FIG. 3 is a schematic diagram showing an example of an outline of a technique used by the object detection device according to the embodiment to detect a distance to an object.

FIG. 3 is a schematic diagram showing an example of an outline of a technique used by the object detection device 200 according to the embodiment to detect a distance to an object.

In the example shown in FIG. 3, a temporal change in a signal level (for example, amplitude) of the ultrasonic wave transmitted and received by the object detection device 200 according to the embodiment is shown in a graph form. In the graph shown in FIG. 3, a horizontal axis corresponds to time, and a vertical axis corresponds to a signal level of a signal transmitted and received by the object detection device 200 via the transmission and reception unit 210 (the vibrator 211).

In the graph shown in FIG. 3, a solid line L11 represents an example of an envelope curve (envelope waveform) showing the temporal change in the signal level of the signal transmitted and received by the object detection device 200, that is, a degree of the vibration of the vibrator 211. Based on the solid line L11, it can be seen that when the vibrator 211 is driven and vibrating for time Ta from a timing t0, the transmission of the transmission wave is completed at a timing t1, and then during time Tb until a timing t2, the vibration of the vibrator 211 due to inertia continues while attenuating. Therefore, in the graph shown in FIG. 3, the time Tb corresponds to a so-called reverberation time.

The solid line L11 reaches a peak at which the degree of the vibration of the vibrator 211 exceeds (or equal to or more than) a predetermined threshold value Th1 shown by a dashed-dotted line L21 at a timing t4 at which time Tp elapses from the timing t0 at which the transmission of the transmission wave is started. The threshold value Th1 is a value set in advance for identifying whether the vibration of the vibrator 211 is caused by reception of a reception wave that is a transmission wave reflected and returned by an object to be detected (for example, the object O shown in FIG. 2) or is caused by reception of a reception wave that is a transmission wave reflected and returned by an object not to be detected (for example, the road surface RS shown in FIG. 2).

FIG. 3 shows an example in which the threshold value Th1 is set as a constant value that does not change as time elapses, and the threshold value Th1 in the embodiment may be set as a value that changes as time elapses.

Here, the vibration having a peak exceeding (or equal to or more than) the threshold value Th1 can be considered to be caused by the reception of the reception wave that is the transmission wave reflected and returned by the object to be detected. On the other hand, the vibration having a peak lower than (or less than) the threshold value Th1 can be considered to be caused by the reception of the reception wave that is the transmission wave reflected and returned by the object not to be detected.

Therefore, based on the solid line L11, it can be seen that the vibration of the vibrator 211 at the timing t4 is caused by the reception of the reception wave that is the transmission wave reflected and returned by the object to be detected.

In the solid line L11, the vibration of the vibrator 211 is attenuated after the timing t4. Therefore, the timing t4 corresponds to a timing at which the reception of the reception wave that is the transmission wave reflected and returned by the object to be detected is completed, in other words, a timing at which the last transmission wave transmitted at the timing t1 returns as the reception wave.

Further, in the solid line L11, a timing t3 as a start point of the peak at the timing t4 corresponds to a timing at which the reception of the reception wave that is the transmission wave reflected and returned by the object to be detected is started, in other words, a timing at which the first transmission wave transmitted at the timing t0 returns as the reception wave. Therefore, in the solid line L11, time ΔT between the timing t3 and the timing t4 is equal to the time Ta as transmission time of the transmission wave.

Based on the above description, in order to obtain a distance to the object to be detected by the TOF method, it is necessary to obtain time Tf between the timing t0 at which the transmission wave starts to be transmitted and the timing t3 at which the reception wave starts to be received. The time Tf can be obtained by subtracting the time ΔT equal to the time Ta that is the transmission time of the transmission wave from the time Tp that is a difference between the timing t0 and the timing t4 at which the signal level of the reception wave reaches the peak exceeding the threshold value Th1.

The timing t0 at which the transmission wave starts to be transmitted can be easily specified as a timing at which the object detection device 200 starts operating, and the time Ta that is the transmission time of the transmission wave is determined in advance by setting or the like. Therefore, in order to obtain the distance to the object to be detected by the TOF method, it is important to specify the timing t4 at which the signal level of the reception wave reaches the peak exceeding the threshold value Th1.

Here, in the detection based on the TOF method as described above, it is desired to detect information related to the object to be detected with higher accuracy while avoiding an influence of noise referred to as clutter generated due to reflection by an object other than the object to be detected.

Therefore, in the embodiment, the object detection device 200 has the following configuration, thereby implementing detection of the information related to the object to be detected with higher accuracy.

Figure 4:
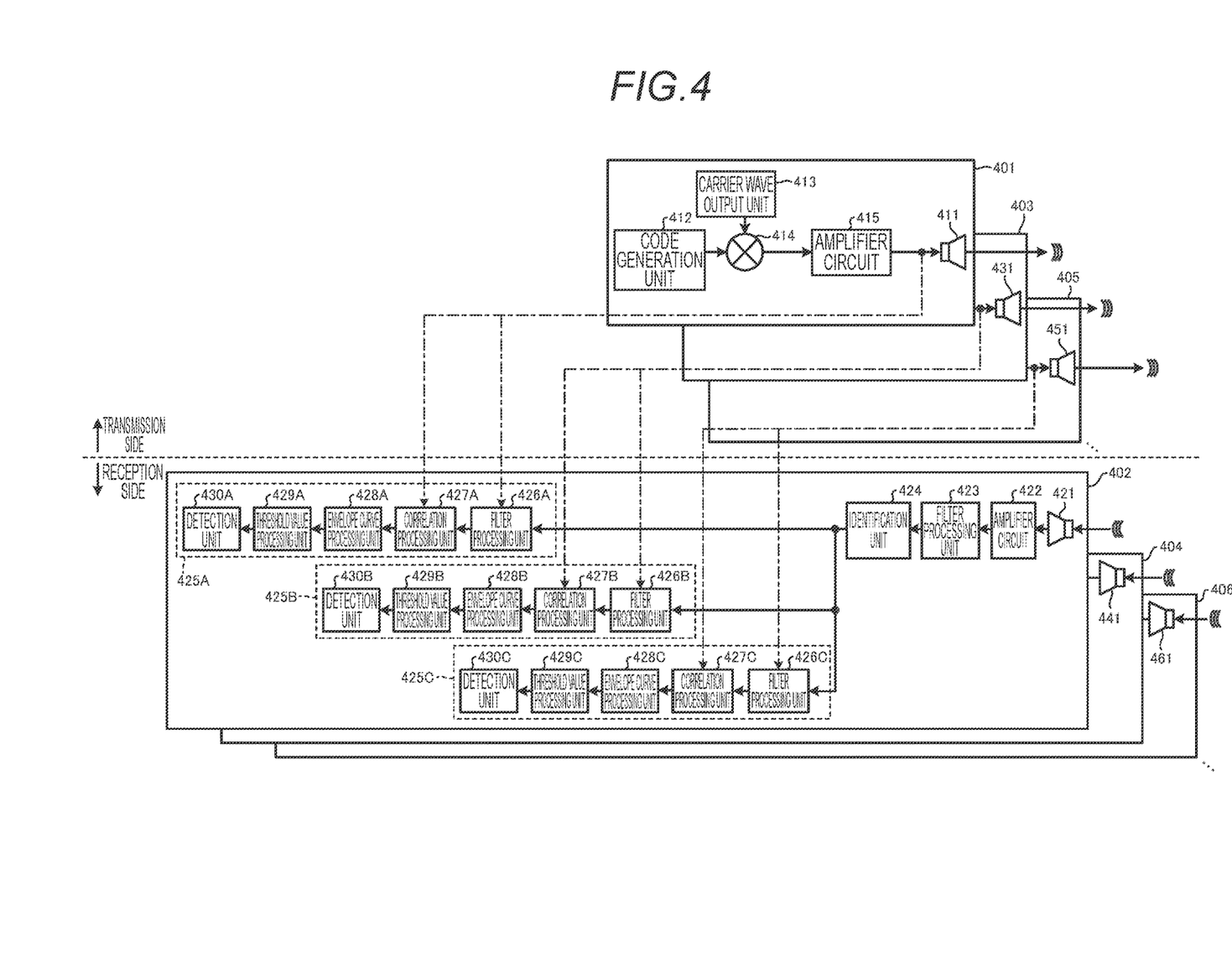
FIG. 4 is a schematic block diagram showing an example of a detailed configuration of the object detection device according to the embodiment.

FIG. 4 is a schematic block diagram showing an example of a detailed configuration of the object detection device 200 according to the embodiment.

As shown in FIG. 4, the object detection system according to the embodiment includes a plurality of (for example, three) transmission units 401, 403, and 405 as a configuration on the transmission side, and includes a plurality of (for example, three) reception units 402, 404, and 406 as a configuration on the reception side.

In FIG. 4, the configuration on the transmission side and the configuration on the reception side are shown in a separated state, and such a form shown in the drawings is merely for convenience of description. Therefore, in the example shown in FIG. 4, for example, a combination of the transmission unit 401 and the reception unit 402, a combination of the transmission unit 403 and the reception unit 404, and a combination of the transmission unit 405 and the reception unit 406 separately constitute one object detection device 200. However, as described above, the technique of the embodiment is also naturally applicable to the configuration in which the configuration on the transmission side and the configuration on the reception side are separated from each other.

FIG. 4 shows three configurations on the transmission side and three configurations on the reception side, and one configuration on the transmission side and one configuration on the reception side may be further provided in the embodiment to correspond to the four object detection devices 200 shown in FIG. 1.

In the embodiment, at least a part of the configuration shown in FIG. 4 may be implemented by dedicated hardware (circuit), and a remaining part of the configuration may be implemented as a result of cooperation between hardware and software, more specifically, as a result of the processor 223 of the object detection device 200 reading a computer program from the storage device 222 and executing the computer program.

First, the configuration of the transmission side of the object detection device 200 will be described.

As shown in FIG. 4, the transmission unit 401 includes a wave transmitter 411, a code generation unit 412, a carrier wave output unit 413, a multiplier 414, and an amplifier circuit 415.

The transmission units 403 and 405 include wave transmitters 431 and 451 the same as the wave transmitter 411, respectively. In FIG. 4, illustration other than the wave transmitters 431 and 451 is omitted for convenience of space, but the transmission units 403 and 405 have the same configuration as the transmission unit 401 in addition to the wave transmitters 431 and 451.

The wave transmitter 411 includes the above-described vibrator 211, and the vibrator 211 transmits a transmission wave corresponding to a transmission signal (after amplification) output from the amplifier circuit 415.

Here, in the embodiment, the wave transmitter 411 is configured to transmit, for example, under control of the ECU 100, a transmission wave substantially at the same time with the wave transmitters 431 and 451 of the other object detection devices 200. Therefore, in the embodiment, it is necessary to specify a transmission source of the transmission wave returned as the reception wave by some method.

Therefore, in the embodiment, the code generation unit 412, the carrier wave output unit 413, and the multiplier 414 function as a configuration for causing the wave transmitter 411 to transmit a transmission wave that is encoded to attach identification information thereto for each object detection device 200.

That is, referring back to FIG. 4, the code generation unit 412 generates a signal (pulse signal) corresponding to a code of a bit string formed of, for example, consecutive 0 or 1 bits. A length of the bit string corresponds to a code length of the identification information attached to the transmission signal. The code length is set such that at least four object detection devices 200 can be identified from each other in the configuration in which the four object detection devices 200 are provided as shown in FIG. 1.

The carrier wave output unit 413 outputs a carrier wave that is a signal to which the identification information is to be attached.

The multiplier 414 modulates the carrier wave so as to attach the identification information thereto by multiplying an output from the code generation unit 412 and an output from the carrier wave output unit 413. Then, the multiplier 414 outputs the modulated carrier wave to which the identification information is attached to the amplifier circuit 415 as a transmission signal that is a source of the transmission wave. In the embodiment, as a modulation method, for example, a single modulation method or a combination of two or more of a plurality of modulation methods that are generally well known, such as an amplitude modulation method or a phase modulation method, may be used.

The amplifier circuit 415 amplifies the transmission signal output from the multiplier 414 and outputs the amplified transmission signal to the wave transmitter 411.

Next, the configuration of the reception side of the object detection device 200 will be described.

As shown in FIG. 4, the reception unit 402 includes a wave receiver 421, an amplifier circuit 422, a filter processing unit 423, an identification unit 424, and a plurality of (for example, three) signal processing systems 425A to 425C.

The reception units 404 and 406 include wave receivers 441 and 461 the same as the wave receiver 421, respectively. In FIG. 4, illustration other than the wave receivers 441 and 461 is omitted for convenience of space, and the reception units 404 and 406 have the same configuration as the reception unit 402 in addition to the wave receivers 441 and 461.

The wave receiver 421 includes the vibrator 211. The vibrator 211 receives a transmission wave reflected by an object as a reception wave.

The amplifier circuit 422 amplifies a reception signal that is a signal corresponding to the reception wave received by the receiver 421.

The filter processing unit 423 performs filtering processing on the reception signal amplified by the amplifier circuit 422 to reduce noise.

Here, in the embodiment, as described above, a plurality of transmission waves are transmitted substantially at the same time from the plurality of wave transmitters 411, 431, and 451. Therefore, the reception wave received by the wave receiver 421 includes a plurality of surges corresponding to the plurality of transmission waves transmitted from the plurality of wave transmitters 411, 431, and 451. As a result, an output from the filter processing unit 423 also includes a plurality of signals corresponding to the plurality of surges.

Therefore, the identification unit 424 demodulates the signal processed by the filter processing unit 423 by a demodulation method corresponding to the modulation method implemented in the configuration on the transmission side, and identifies transmission sources of the plurality of surges included in the reception waves received by the wave receiver 421 based on the identification information obtained as a result of the demodulation.

Figure 5:
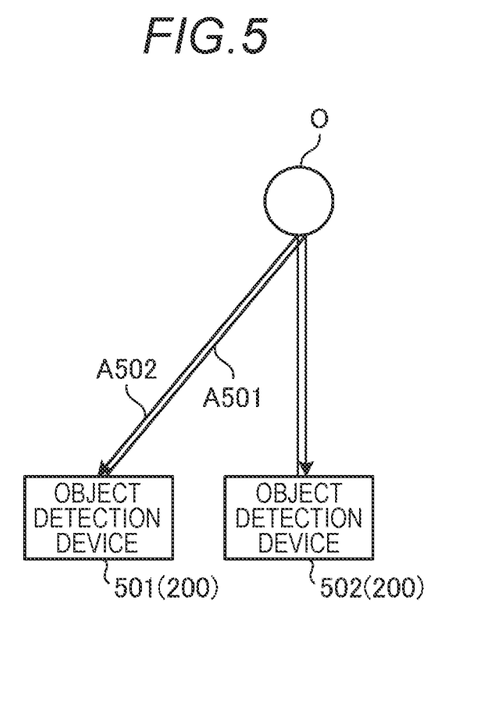
FIG. 5 is a schematic diagram showing an example of a pair of propagation paths of ultrasonic waves that can be specified in the embodiment.

According to the identification result of the identification unit 424, for example, as shown in FIG. 5 below, it is possible to specify a TOF, that is, a pair of propagation paths of ultrasonic waves that have a substantially equal propagation distance.

FIG. 5 is a schematic diagram showing an example of a pair of propagation paths of ultrasonic waves that can be specified in the embodiment.

In the example shown in FIG. 5, an ultrasonic wave transmitted from an object detection device 501 propagates along a propagation path indicated by an arrow A501 including a return in accordance with reflection by the object O, and is received by an object detection device 502. An ultrasonic wave transmitted from the object detection device 502 propagates along a propagation path indicated by an arrow A502 having a length substantially the same as that of the arrow A501 and oriented in the opposite direction, and is received by the object detection device 501.

As a simplest example, FIG. 5 shows an example in which only one pair of propagation paths whose propagation distances are substantially the same is formed between two object detection devices 200. However, in the embodiment, as described above, three or more (four in the example shown in FIG. 1) object detection devices 200 are provided. In this case, a plurality of pairs of propagation paths having a substantially equal propagation distance may be formed between the object detection devices 200 as shown in FIG. 6 below.

Figure 6:
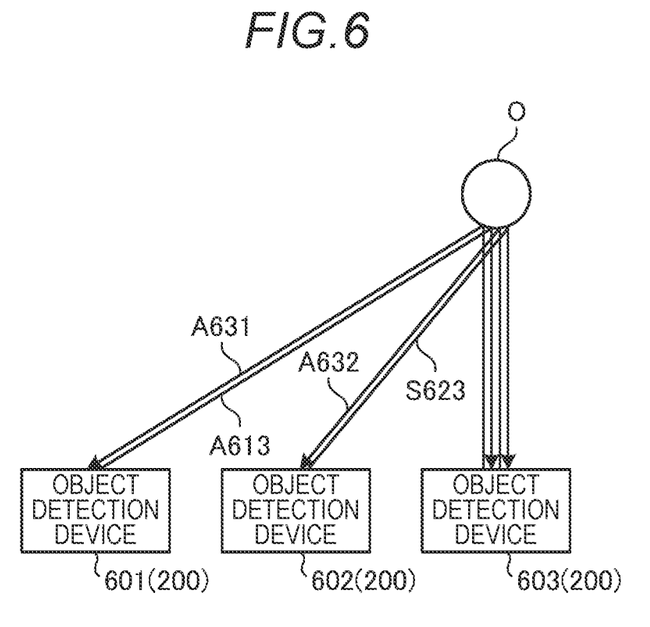
FIG. 6 is a schematic diagram showing an example of a plurality of pairs of propagation paths of ultrasonic waves that can be specified in the embodiment.

FIG. 6 is a schematic diagram showing an example of a plurality of pairs of propagation paths of ultrasonic waves that can be specified in the embodiment.

In the example shown in FIG. 6, a propagation path indicated by an arrow A613 from an object detection device 601 toward an object detection device 603 through reflection by the object O and a propagation path indicated by an arrow A631 from the object detection device 603 toward the object detection device 601 through reflection by the object O constitute one pair. In addition, a propagation path indicated by an arrow A623 from an object detection device 602 toward the object detection device 603 through reflection by the object O and a propagation path indicated by an arrow A632 from the object detection device 603 toward the object detection device 602 through reflection by the object O constitute one pair.

Illustration is omitted for simplification, but in the example shown in FIG. 6, in addition to the two pairs described above, a propagation path of an ultrasonic wave from the object detection device 601 toward the object detection device 602 through reflection by the object O and a propagation path of an ultrasonic wave from the object detection device 602 toward the object detection device 601 through reflection by the object O may be one pair.

As described above, in the configuration in which three object detection devices 200 (four or more object detection devices 200 can be analogized by the same idea) are provided, a plurality of pairs of propagation paths having a substantially equal propagation distance are formed.

Figure 7:
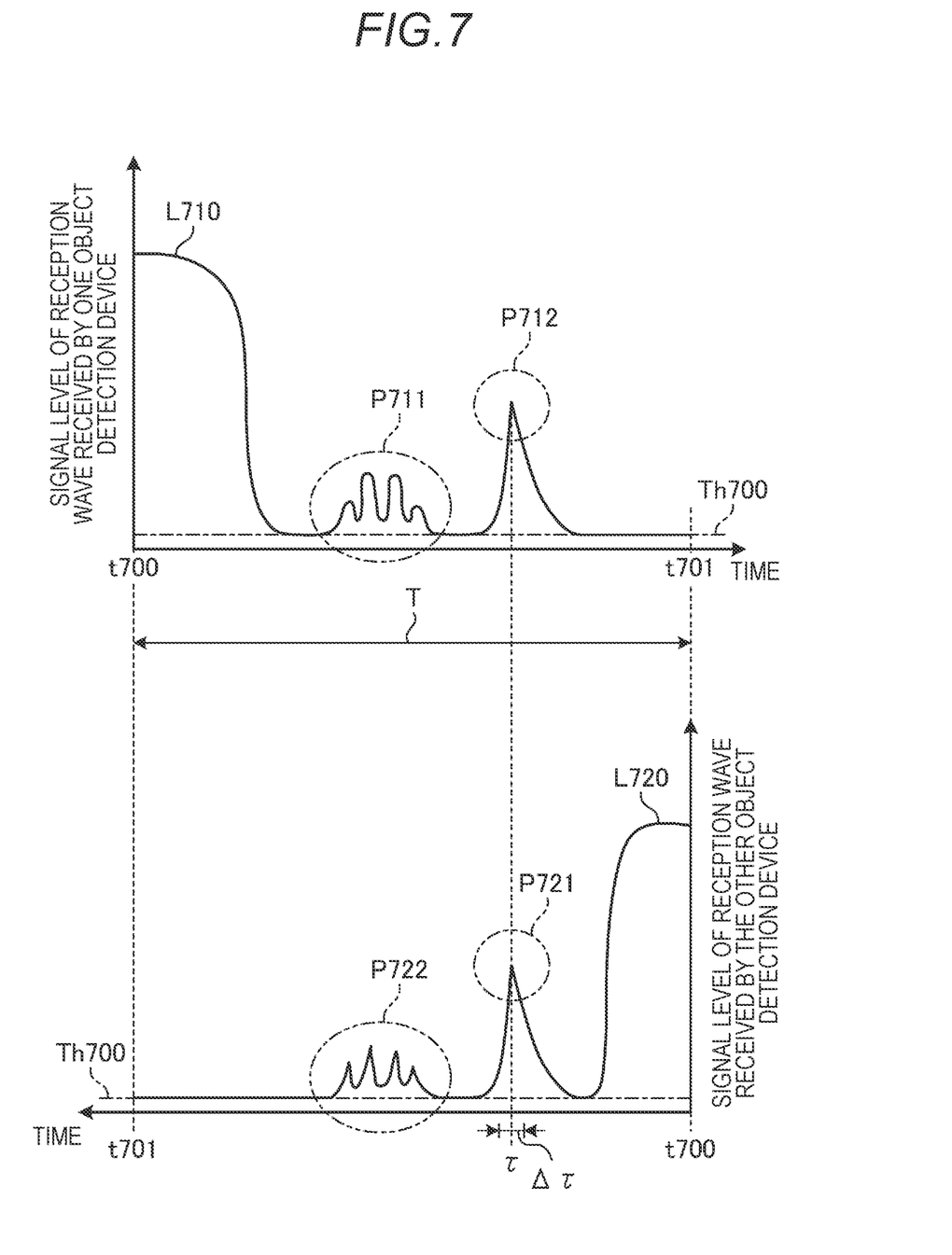
FIG. 7 is a schematic diagram showing an example of a method for detecting information related to an object to be detected with higher accuracy while avoiding an influence of clutter in the embodiment.

When a pair of propagation paths having a substantially equal propagation distance is focused, it is possible to detect the information related to the object to be detected with higher accuracy while avoiding the influence of clutter by a method as shown in FIG. 7 below.

FIG. 7 is a schematic diagram showing an example of a method for detecting the information related to the object to be detected with higher accuracy while avoiding the influence of clutter in the embodiment.

An example shown in FIG. 7 indicates a correspondence relationship between envelope waveforms of signal levels of reception waves respectively received by two object detection devices 200 that satisfy a condition of forming a pair of propagation paths having equal propagation distances. More specifically, in the example shown in FIG. 7, an upper solid line L710 corresponds to an envelope waveform of a signal level of a reception wave received by one object detection device 200, and a lower solid line L720 corresponds to an envelope waveform of a signal level of a reception wave received by the other object detection device 200. In the following description, the waveform indicated by the solid line L710 may be expressed as a first envelope waveform, and the waveform indicated by the solid line L720 may be expressed as a second envelope waveform.

In the example shown in FIG. 7, a timing t700 is a timing at which two object detection devices 200 satisfying the above condition transmit transmission waves, and a timing t701 is a timing at which two object detection devices 200 satisfying the above condition receive the transmitted waves returned in accordance with reflection by an object as the reception waves. In the example shown in FIG. 7, for convenience of description, a time series of the first envelope waveform shown by the solid line L710 and a time series of the second envelope waveform shown by the solid line L720 are opposite to each other.

As shown in FIG. 7, in the first envelope waveform shown by the solid line L710 and the second envelope waveform shown by the solid line L720, when the time series within a predetermined section T between the timing t700 and the timing t701 is reversed, large peaks (see parts P712 and P721 surrounded by chain double-dashed lines) showing reflection by the object to be detected are reached at substantially the same timing $\tau$.

On the other hand, since clutter caused by reflection by an object not to be detected generally shows a random phase change, a plurality of peaks corresponding to the clutter (see parts P711 and P722 surrounded by chain double-dashed lines) generally appear within the same period, but timings of the respective peaks are different from each other when being compared in detail.

Therefore, in the example shown in FIG. 7, the technique of the embodiment focuses on the correspondence relationship between two surges transmitted and received along a pair of propagation paths having a substantially equal propagation distance, and detects the information related to the object to be detected while avoiding the influence of clutter based on a correspondence relationship between a first peak of the first envelope waveform indicated by the solid line L710 in the predetermined section T of a first surge and a second peak of the second envelope waveform indicated by the solid line L720 in the predetermined section T of a second surge.

That is, in the example shown in FIG. 7, the technique of the embodiment focuses on the correspondence relationship between the peaks of the first envelope waveform indicated by the solid line L710 and the second envelope waveform indicated by the solid line L720, specifies the peaks (see parts P712 and P721 surrounded by chain double-dashed lines) that appear at substantially the same timing when the time series is reversed as peaks indicating the reflection by the object to be detected, and specifies other peaks (see parts P711 and P722 surrounded by chain double-dashed lines) as peaks indicating the clutter caused by reflection of the object not to be detected.

In the embodiment, when the first peak and the second peak are compared with each other, it is desirable to allow a predetermined deviation due to an error or the like. Therefore, in the embodiment, when a difference indicated by $\Delta\tau$ between a section length from a start of the predetermined section T in the first envelope waveform indicated by the solid line L710 to appearance of the first peak and a section length from appearance of the second peak in the second envelope waveform indicated by the solid line L720 to an end of the predetermined section T is within a predetermined range, it is determined that the first peak and the second peak correspond to each other.

In the embodiment, it is desirable to reduce obvious noise that is neither a peak indicating reflection by an object to be detected nor a peak indicating clutter caused by reflection by an object not to be detected. Therefore, in the embodiment, one or more peaks whose signal level is equal to or higher than a predetermined threshold value Th700 in the first envelope waveform and the second envelope waveform are specified as the first peak and the second peak. The predetermined threshold value Th700 is determined based on, for example, an average value E, a standard deviation a, and the like of signal levels of various noise.

Based on the above description, referring back to FIG. 4, the identification unit 424 distributes and outputs the output from the filter processing unit 423 to the signal processing systems 425A, 425B, and 425C in accordance with the identification result of the transmission sources. As a result, for example, different signals are input to the signal processing systems 425A, 425B, and 425C from the transmission sources.

The signal processing systems 425A, 425B, and 425C include filter processing units 426A, 426B, and 426C, correlation processing units 427A, 427B, and 427C, envelope curve processing units 428A, 428B, and 428C, threshold value processing units 429A, 429B, and 429C, and detection units 430A, 430B, and 430C, respectively.

In the following description, when it is not necessary to be distinguished from each other, the signal processing systems 425A, 425B, and 425C may be simply referred to as a signal processing system 425, the filter processing units 426A, 426B, and 426C may be simply referred to as a filter processing unit 426, the correlation processing units 427A, 427B, and 427C may be simply referred to as a correlation processing unit 427, the envelope curve processing units 428A, 428B, and 428C may be simply referred to as an envelope curve processing unit 428, the threshold value processing units 429A, 429B, and 429C may be simply referred to as a threshold value processing unit 429, and the detection units 430A, 430B, and 430C may be simply referred to as a detection unit 430.

In order to more accurately execute correlation processing by, for example, the following correlation processing unit 427, the filter processing unit 426 corrects a frequency of a signal received from the identification unit 424 to match a frequency of the transmission signal acquired from the corresponding transmission units 401, 403, and 405.

Then, the correlation processing unit 427 acquires a correlation value corresponding to a similarity degree of the identification information between the transmission wave and the reception wave based on the transmission signals acquired from the corresponding transmission units 401, 403, and 405 and the signal subjected to the filtering processing by the filter processing unit 426. The correlation value is calculated based on a generally well-known correlation function or the like.

Then, the envelope curve processing unit 428 obtains an envelope waveform of the correlation value acquired by the correlation processing unit 427.

Since the example shown in FIG. 7 is an example of the envelope waveform of the signal level of the reception wave, precisely speaking, the envelope waveform of the correlation value obtained by the envelope curve processing unit 428 is different from the example shown in FIG. 7. However, since the signal level of the reception wave and the correlation value are related to each other, it is possible to detect the information related to the object to be detected with higher accuracy while avoiding the influence of clutter even with the envelope waveform of the correlation value as long as noise is removed and the peaks are compared by the same idea as the example shown in FIG. 7.

That is, the threshold value processing unit 429 excludes, from the envelope waveform of the correlation value, a section whose signal level is less than a predetermined threshold value corresponding to the threshold value Th700 shown in FIG. 7 and that does not have a peak indicating reflection by an object to be detected or a peak indicating clutter caused by reflection by an object not to be detected.

Then, the detection unit 430 acquires, from the other object detection device 200, information to be compared with an output from the threshold value processing unit 429, and compares the peaks.

For example, in the example shown in FIG. 5, the detection unit 430 of the object detection device 501 acquires an output from the threshold value processing unit 429 of the object detection device 502 as a first envelope waveform, and specifies a first peak and a second peak, which substantially coincide in a timing when the time series is reversed, as peaks indicating the reflection by the object to be detected, by using the first envelope waveform and a second envelope waveform which is an output from the threshold value processing unit 429 of the object detection device 501. Therefore, the detection unit of the object detection device 501 and the detection unit 430 of the object detection device 502 detect a distance to the object to be detected by the TOF method based on at least one of the first peak and the second peak. The same applies to the example shown in FIG. 7.

As described above, in the embodiment, the detection unit 430 focuses on two object detection devices 200 in which propagation paths having a substantially equal propagation distance are formed, and detects the information related to the object while avoiding the influence of clutter based on the correspondence relationship between the first surge transmitted by the other object detection device 200 and received by the one object detection device 200 and the second surge transmitted by the one object detection device 200 and received by the other object detection device 200, which are specified based on the identification result by the identification unit 424.

In the embodiment, the above-described units of the object detection device 200 may operate under control of the control unit 220 of the object detection device 200 itself, or may operate under control of the external ECU 100.

Hereinafter, a flow of processing executed in the embodiment will be described.

Figure 8:
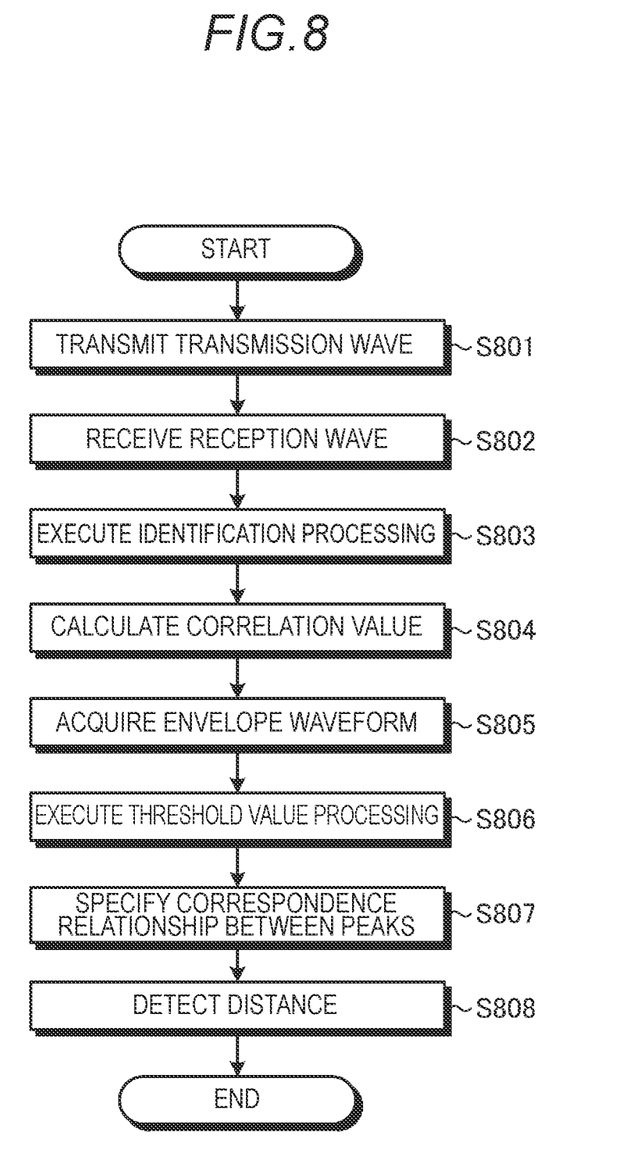
FIG. 8 is a schematic flowchart showing an example of a series of processing executed by the object detection device according to the embodiment to detect information related to an object.

FIG. 8 is a schematic flowchart showing an example of a series of processing executed by the object detection device 200 according to the embodiment to detect information related to an object.

As shown in FIG. 8, in the embodiment, first, in S801, the wave transmitters 411, 431, and 451 transmit the transmission waves corresponding to the transmission signals generated by the code generation unit 412, the carrier wave output unit 413, the multiplier 414, and the amplifier circuit 415 to the outside of the vehicle 1 substantially at the same time.

Then, in S802, the wave receivers 421, 441, and 461 receive the reception waves, that are the transmission waves returned to a vehicle 1 side as a result of being reflected by an object present outside the vehicle 1. The reception waves are subjected to the processing by the amplifier circuit 422 and the filter processing unit 423 and are input to the identification unit 424.

Then, in S803, the identification unit 424 executes identification processing for identifying the transmission sources of the plurality of surges included in the reception waves received in S802. According to a result of the identification processing, the identification unit 424 distributes and outputs the output from the filter processing unit 423 to the plurality of signal processing systems 425. The output from the identification unit 424 is subjected to the processing by the filter processing unit 426 of the signal processing system 425 and is input to the correlation processing unit 427.

In S804, the correlation processing unit 427 acquires a correlation value corresponding to the similarity degree of the identification information based on the transmission signals acquired from the corresponding transmission units 401, 403, and 405 and the output from the corresponding filter processing unit 426.

Then, in S805, the envelope curve processing unit 428 acquires an envelope waveform of the correlation value acquired in S804.

Then, in S806, the threshold value processing unit 429 executes threshold value processing for excluding, from the envelope waveform acquired in S805, a section whose signal level is less than a predetermined threshold value corresponding to noise and that does not have the peak indicating the reflection by the object to be detected or the peak indicating the clutter caused by the reflection by the object not to be detected.

Then, in S807, the detection unit 430 acquires, as a first envelope waveform, the output from the threshold value processing unit 429 of the other object detection device 200 that forms propagation paths having an equal propagation distance with the object detection device 200 in which the detection unit 430 is provided, and specifies a correspondence relationship between a first peak of the first envelope waveform and a second peak of a second envelope waveform that is an envelope waveform obtained by the threshold value processing in S806.

Then, in S808, the detection unit 430 specifies the first peak and the second peak, which substantially coincide in a timing (an error within a predetermined range is allowed) when the time series is reversed, as peaks indicating the reflection by the object to be detected based on the correspondence relationship specified in S807, and detects a distance to the object to be detected by the TOF method based on at least one of the first peak and the second peak. Then, the processing ends.

As described above, one of the plurality of object detection devices 200 according to the embodiment includes the transmission unit 401, the reception unit 402, the identification unit 424, and the detection unit 430. The transmission unit 401 transmits a transmission wave substantially at the same time with other transmission units 403 and 405 included in other object detection devices 200. The reception unit 402 receives a reception wave including a plurality of surges corresponding to a result of returning the transmission wave transmitted by the transmission unit 401 and other transmission waves transmitted by the other transmission unit 403 and 405 in accordance with reflection by an object. The identification unit 424 identifies the transmission source of the plurality of surges included in the reception wave. The detection unit 430 detects information related to the object based on a correspondence relationship between (i) a first peak included in a first waveform indicating a first surge transmitted by the other transmission units 403 and 405 provided in the other object detection devices 200 and received by the reception unit 402 and (ii) a second peak included in a second waveform indicating a second surge transmitted by the transmission unit 401 and received by the other reception units 404 and 406 provided in the other object detection devices 200, the first peak and the second peak being specified based on an identification result of the identification unit 424 and other identification units 424 provided in the other object detection devices 200.

According to the above-described object detection device 200, peaks corresponding to the clutter appear at random in two types of waveforms indicating two types of surges propagating along propagation paths having substantially an equal propagation distance, while peaks corresponding to the reflection by the object to be detected appear at substantially the same timing when time series of the two kinds of waveforms are reversed (for example, see FIG. 7). Therefore, according to the correspondence relationship between the first peak and the second peak, it is possible to detect the information related to the object to be detected with higher accuracy while avoiding the influence of the clutter.

More specifically, in the embodiment, the detection unit 430 detects the information related to the object based on the correspondence relationship between the first peak of the first waveform that is a first envelope waveform in a predetermined section of a signal level of the first surge and the second peak of the second waveform that is a second envelope waveform in a predetermined section of a signal level of the second surge. According to such a configuration, it is possible to easily detect the information related to the object to be detected with higher accuracy in consideration of the correspondence relationship between the peaks of the envelope waveforms.

In this case, the detection unit 430 detects the information related to the object based on at least one of the first peak and the second peak in which a difference between a section length from a start of the predetermined section in the first envelope waveform to appearance of the first peak and a section length from appearance of the second peak in the second envelope waveform to an end of the predetermined section is within a predetermined range. For example, in the example shown in FIG. 7, for the peaks at the parts P712 and P721 surrounded by the chain double-dashed lines, the difference indicated by Δτ between the section length from the timing t700 corresponding to the start of the predetermined section T in the first envelope waveform indicated by the solid line L710 and the section length from the timing t700 corresponding to the end of the predetermined section T in the second envelope waveform indicated by the solid line L720 is within the predetermined range. Therefore, in the example shown in FIG. 7, the information related to the object is detected based on (at least one of) the peaks in the parts P712 and P721 surrounded by the chain double-dashed lines. According to such a configuration, it is possible to appropriately specify the peak indicating the reflection by the object to be detected in consideration of an error within a predetermined range.

In addition, in this case, the detection unit 430 specifies peaks whose signal levels of the first envelope waveform and the second envelope waveform are equal to or more than a predetermined threshold value (see the threshold value Th700 shown in FIG. 7) corresponding to noise as the first peak and the second peak. According to such a configuration, it is possible to easily specify a peak that satisfies the condition while eliminating the influence of the noise.

In the embodiment, the transmission unit 401 modulates the transmission wave by a predetermined modulation method to include the identification information for identifying the object detection device 200, and then transmits the modulated transmission wave. Then, the identification unit 424 identifies the transmission sources of the plurality of surges included in the reception waves based on a result of demodulating the reception wave by the demodulation method corresponding to the predetermined modulation method. According to such a configuration, it is possible to easily identify the transmission source of the plurality of surges included in the reception wave.

In the embodiment, the object detection device 200 is an in-vehicle sonar that detects a distance to the object O on the road surface RS as the information related to the object. According to such a configuration, the technique disclosed here can be applied to an in-vehicle sonar which is desired to detect the distance to the object O on the road surface RS with higher accuracy while avoiding the influence of the clutter.

<Modification>

In the above-described embodiment, the technique disclosed here is applied to a configuration in which information related to an object is detected by transmission and reception of ultrasonic waves. Alternatively, the technique disclosed here can also be applied to a configuration in which information related to an object is detected by transmission and reception of sound waves, millimeter waves, electromagnetic waves, or the like as surges other than the ultrasonic waves.

In addition, in the above-described embodiment, a configuration in which a distance to the object is detected as the information related to the object is exemplified. Alternatively, the technique disclosed here can also be applied to a configuration in which only presence or absence of an object is detected as information related to the object.

In addition, in the above-described embodiment, the configuration in which the detection unit that detects the information related to the object (the distance to the object) is provided in each of the plurality of object detection devices is exemplified. Alternatively, the technique disclosed here can also be applied to a configuration in which the detection unit that detects the information related to the object is provided outside the object detection device as shown in FIG. 9.

Figure 9:
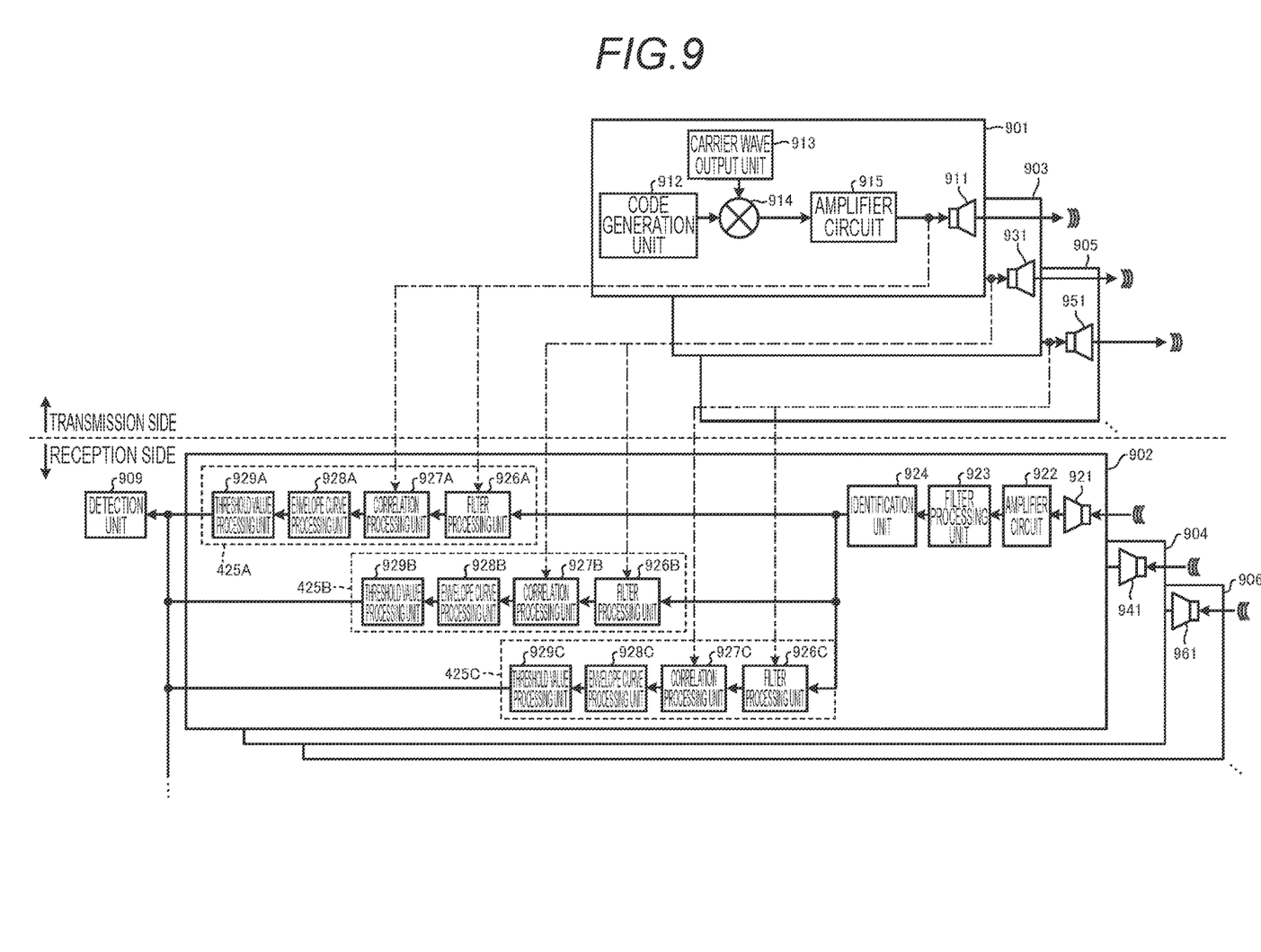
FIG. 9 is a schematic block diagram showing an example of a configuration of an object detection system according to a modification of the embodiment.

FIG. 9 is a schematic block diagram showing an example of a configuration of an object detection system according to a modification of the embodiment.

As shown in FIG. 9, the object detection system according to the modification includes a plurality of (for example, three) transmission units 901, 903, and 905 as a configuration on the transmission side, and includes a plurality of (for example, three) reception units 902, 904, and 906 as a configuration on the reception side. In this modification, similar to the above-described embodiment (see FIG. 4), for example, a combination of the transmission unit 901 and the reception unit 902, a combination of the transmission unit 903 and the reception unit 904, and a combination of the transmission unit 905 and the reception unit 906 respectively constitute one object detection device.

In the modification shown in FIG. 9, the transmission unit 901 includes a wave transmitter 911, a code generation unit 912, a carrier wave output unit 913, a multiplier 914, and an amplifier circuit 915. These configurations are substantially the same as the corresponding configurations in the above-described embodiment (see FIG. 4).

In FIG. 9, illustration other than the wave transmitters 931 and 951 is omitted for convenience of space, and the transmission units 903 and 905 have the same configuration as the transmission unit 901 in addition to the wave transmitters 931 and 951.

On the other hand, in the modification shown in FIG. 9, the reception unit 902 includes a wave receiver 921, an amplifier circuit 922, a filter processing unit 923, an identification unit 924, and a plurality of (for example, three) signal processing systems 425A, 425B, and 425C. These configurations are generally the same as the corresponding configurations in the above-described embodiment (see FIG. 4).

However, in the modification shown in FIG. 9, the signal processing systems 425A, 425B, and 425C only include filter processing units 926A, 926B, and 926C, correlation processing units 927A, 927B, and 927C, envelope curve processing units 928A, 928B, and 928C, and threshold value processing units 929A, 929B, and 929C, respectively. That is, in the modification, the signal processing systems 425A, 425B, and 425C do not have configurations corresponding to the detection units 430A, 430B, and 430C according to the above-described embodiment (see FIG. 4).

Therefore, in the modification shown in FIG. 9, a detection unit 909 corresponding to the detection units 430A, 430B, and 430C according to the above-described embodiment is provided outside the reception units 902, 904, and 906. That is, in the modification, the detection unit 909 is implemented not by the object detection device but by an information processing device connected to the object detection device, such as the ECU 100 according to the above-described embodiment (see FIG. 2). According to such a configuration, the information processing device can comprehensively detect the information related to the object to be detected with higher accuracy while avoiding the influence of clutter.

An object detection device as an example of this disclosure includes: a transmission unit configured to transmit a transmission wave substantially at the same time with another transmission unit provided in another object detection device; a reception unit configured to receive a reception wave including a plurality of surges corresponding to a result of return of the transmission wave transmitted by the transmission unit and another transmission wave transmitted by the another transmission unit in accordance with reflection by an object; an identification unit configured to identify a transmission source of the plurality of surges included in the reception wave; and a detection unit configured to detect information related to the object based on a correspondence relationship between a first peak of a first waveform indicating a first surge transmitted by the another transmission unit provided in the another object detection device and received by the reception unit and a second peak of a second waveform indicating a second surge transmitted by the transmission unit and received by another reception unit provided in the another object detection device, the first peak and the second peak being specified based on an identification result of the identification unit and another identification unit provided in the another object detection device.

According to the above-described object detection device, peaks corresponding to clutter appear at random in two types of waveforms indicating two types of surges propagating along propagation paths having substantially the same propagation distance, while peaks corresponding to the reflection by the object to be detected appear at substantially the same timing when the time series of the two types of waveforms is reversed. Therefore, according to the correspondence relationship between the first peak and the second peak, it is possible to detect the information related to the object to be detected with higher accuracy while avoiding the influence of the clutter.

In the above-described object detection device, the detection unit may detect the information related to the object based on the correspondence relationship between the first peak included in the first waveform that is a first envelope waveform in a predetermined section of a signal level of the first surge and the second peak included in the second waveform that is a second envelope waveform in a predetermined section of a signal level of the second surge. According to such a configuration, it is possible to easily detect the information related to the object to be detected with higher accuracy in consideration of the correspondence relationship between the peaks of the envelope waveforms.

In this case, the detection unit may detect the information related to the object based on at least one of the first peak and the second peak whose difference between a section length from a start of the predetermined section in the first envelope waveform to appearance of the first peak and a section length from appearance of the second peak in the second envelope waveform to an end of the predetermined section is within a predetermined range. According to such a configuration, it is possible to appropriately specify the first peak and the second peak indicating the reflection by the object to be detected in consideration of an error within a predetermined range.

In addition, in this case, the detection unit may specify peaks whose signal levels of the first envelope waveform and the second envelope waveform are equal to or more than a predetermined threshold value corresponding to noise as the first peak and the second peak. According to such a configuration, it is possible to easily specify the first peak and the second peak that satisfy a condition while eliminating the influence of the noise.

In the above-described object detection device, the transmission unit may modulate the transmission wave by a predetermined modulation method to include identification information for identifying the object detection device, and then transmit the modulated transmission wave. The identification unit may identify the transmission source of the plurality of surges included in the reception wave based on a result of demodulating the reception wave by a demodulation method corresponding to the predetermined modulation method. According to such a configuration, it is possible to easily identify the transmission source of the plurality of surges included in the reception wave.

In the above-described object detection device, the object detection device may be configured as an in-vehicle sonar that detects a distance to an object on a road surface as the information related to the object. According to such a configuration, the technique of this disclosure can be applied to an in-vehicle sonar which is desired to detect the distance to the object on the road surface with higher accuracy while avoiding an influence of clutter.

An object detection system as another example of this disclosure includes: a plurality of object detection devices each including a transmission unit configured to transmit a transmission wave substantially at the same time with another transmission unit provided in another object detection device, a reception unit configured to receive a reception wave including a plurality of surges corresponding to a result of return of the transmission wave transmitted by the transmission unit and another transmission wave transmitted by the another transmission unit in accordance with reflection by an object, and an identification unit configured to identify a transmission source of the plurality of surges included in the reception wave; and a detection unit configured to detect information related to the object based on a correspondence relationship between a first peak of a first waveform indicating a first surge transmitted by the transmission unit of a first object detection device among the plurality of object detection devices and received by a second object detection device different from the first object detection device among the plurality of object detection devices and a second peak of a second waveform indicating a second surge transmitted by the transmission unit of the second object detection device and received by the reception unit of the first object detection device, the first peak and the second peak being specified based on an identification result by the identification unit of each of the plurality of object detection devices.

According to the above-described object detection system, changes corresponding to the clutter appear at random in the first surge and the second surge propagating along propagation paths having an equal propagation distance, while changes corresponding to reflection by the object to be detected appear at substantially the same timing when a time series of the first surge and a time series of the second surge are reversed. Therefore, according to the correspondence relationship between the first surge and the second surge, it is possible to detect the information related to the object to be detected with higher accuracy while avoiding the influence of the clutter.

While embodiments and modifications disclosed here have been described, these embodiments and modifications have been presented by way of example only, and are not intended to limit the scope of this disclosure. Indeed, these embodiments and modifications described herein may be embodied in a variety of forms. Furthermore, various omissions, substitutions and changes in the form of these embodiments and modifications described herein may be made without departing from the spirit of this disclosure. The accompanying claims and their equivalents are intended to cover such forms or modifications as would fall within the scope and spirit of this disclosure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
   a transmission unit configured to transmit a transmission wave substantially at the same time with another transmission unit provided in another object detection device;
   a reception unit configured to receive a reception wave including a plurality of surges corresponding to a result of return of the transmission wave transmitted by the transmission unit and another transmission wave transmitted by the another transmission unit in accordance with reflection by an object;
   an identification unit configured to identify a transmission source of the plurality of surges included in the reception wave; and
   a detection unit configured to detect information related to the object based on a correspondence relationship between a first peak of a first waveform indicating a first surge transmitted by the another transmission unit provided in the another object detection device and received by the reception unit and a second peak of a second waveform indicating a second surge transmitted by the transmission unit and received by another reception unit provided in the another object detection device, the first peak and the second peak being specified based on an identification result of the identification unit and another identification unit provided in the another object detection device, wherein
   the detection unit detects the information related to the object based on the correspondence relationship between the first peak included in the first waveform that is a first envelope waveform in a predetermined section of a signal level of the first surge and the second peak included in the second waveform that is a second envelope waveform in a predetermined section of a signal level of the second surge.

2. The object detection device according to claim 1, wherein
   the detection unit detects the information related to the object based on at least one of the first peak and the second peak whose difference between a section length from a start of the predetermined section in the first envelope waveform to appearance of the first peak and a section length from appearance of the second peak in the second envelope waveform to an end of the predetermined section is within a predetermined range.

3. The object detection device according to claim 2, wherein
   the detection unit specifies peaks whose signal levels of the first envelope waveform and the second envelope waveform are equal to or more than a predetermined threshold value corresponding to noise as the first peak and the second peak.

4. The object detection device according to claim 1, wherein
   the transmission unit modulates the transmission wave by a predetermined modulation method to include identification information for identifying the object detection device, and then transmits the modulated transmission wave, and the identification unit identifies the transmission source of the plurality of surges included in the reception wave based on a result of demodulating the reception wave by a demodulation method corresponding to the predetermined modulation method.

5. The object detection device according to claim 1, wherein the object detection device is configured as an in-vehicle sonar that detects a distance to an object on a road surface as the information related to the object.

6. An object detection system comprising:

a plurality of object detection devices each including a transmission unit configured to transmit a transmission wave substantially at the same time with another transmission unit provided in another object detection device, a reception unit configured to receive a reception wave including a plurality of surges corresponding to a result of return of the transmission wave transmitted by the transmission unit and another transmission wave transmitted by the another transmission unit in accordance with reflection by an object, and an identification unit configured to identify a transmission source of the plurality of surges included in the reception wave; and a detection unit configured to detect information related to the object based on a correspondence relationship between a first peak of a first waveform indicating a first surge transmitted by the transmission unit of a first object detection device among the plurality of object detection devices and received by a second object detection device different from the first object detection device among the plurality of object detection devices and a second peak of a second waveform indicating a second surge transmitted by the transmission unit of the second object detection device and received by the reception unit of the first object detection device, the first peak and the second peak being specified based on an identification result by the identification unit of each of the plurality of object detection devices, wherein the detection unit detects the information related to the object based on the correspondence relationship between the first peak included in the first waveform that is a first envelope waveform in a predetermined section of a signal level of the first surge and the second peak included in the second waveform that is a second envelope waveform in a predetermined section of a signal level of the second surge.

7. The object detection device according to claim 1, wherein the detection unit specifies the first peak and the second peak, which substantially coincide in a timing when a time series is reversed and detects a distance to the object to be detected by a time of flight method based on at least one of the first peak and the second peak.

* * * * *